US011411826B2

United States Patent
Jarnikov

(10) Patent No.: US 11,411,826 B2
(45) Date of Patent: Aug. 9, 2022

(54) MONITORING A PEER-TO-PEER NETWORK

(71) Applicant: IRDETO B.V., Hoofddorp (NL)

(72) Inventor: Dmitri Jarnikov, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 843 days.

(21) Appl. No.: 15/562,426

(22) PCT Filed: Mar. 30, 2015

(86) PCT No.: PCT/EP2015/056886
§ 371 (c)(1),
(2) Date: Sep. 28, 2017

(87) PCT Pub. No.: WO2016/155772
PCT Pub. Date: Oct. 6, 2016

(65) Prior Publication Data
US 2018/0287878 A1    Oct. 4, 2018

(51) Int. Cl.
*H04L 67/104* (2022.01)
*H04L 41/12* (2022.01)
*H04L 43/08* (2022.01)

(52) U.S. Cl.
CPC .............. *H04L 41/12* (2013.01); *H04L 43/08* (2013.01); *H04L 67/104* (2013.01)

(58) Field of Classification Search
CPC ....................................................... H04L 43/08
See application file for complete search history.

(56) References Cited

U.S. PATENT DOCUMENTS 8,015,283 B2 * 9/2011 Seidel .................. H04L 41/14
709/224
8,284,662 B2 * 10/2012 Sargor .................. H04L 47/245
709/224

(Continued)

FOREIGN PATENT DOCUMENTS

| CA | 2 980 953 A1 | 10/2016 |
| WO | 2009/1134905 A2 | 11/2009 |
| WO | 2016/155772 A1 | 10/2016 |

OTHER PUBLICATIONS

International Search Report and Written Opinion Issued by WIPO dated Nov. 30, 2015, in connection with International Patent Application No. PCT/EP2015/056886, 13 pages.

(Continued)

*Primary Examiner* — Dhairya A Patel
(74) *Attorney, Agent, or Firm* — Rimon PC; Marc Kaufman

(57) ABSTRACT

There is described a method of monitoring a peer-to-peer network. The method comprises: (i) monitoring network traffic between a first peer and the peer-to-peer network so as to identify a first subset of peers in the peer-to-peer network; and (ii) preventing the first peer from communicating with at least one peer in the first subset of peers to thereby cause the first peer to communicate with at least one further peer in the peer-to-peer network so as to enable identification of the at least one further peer. In addition, there is described a peer-to-peer network monitor for monitoring a peer-to-peer network, wherein the monitor is operable to monitor network traffic between a first peer and the peer-to-peer network so as to identify a subset of peers in the peer-to-peer network in communication with the first peer, and wherein the monitor is operable to prevent the first peer from communicating with at least one peer in the subset of peers to thereby cause the first peer to communicate with at (Continued)

least one further peer in the peer-to-peer network so as to enable the monitor to identify the at least one further peer. Corresponding computer programs and computer-readable media are also described.

12 Claims, 5 Drawing Sheets

(56) References Cited

U.S. PATENT DOCUMENTS

| | | | | |
|---|---|---|---|---|
| 8,588,233 | B1* | 11/2013 | Lohner | H04L 67/141 |
| | | | | 370/392 |
| 2011/0072285 | A1* | 3/2011 | Fischer | G06F 1/3287 |
| | | | | 709/227 |
| 2011/0161417 | A1* | 6/2011 | Le Scouarnec | H04L 67/104 |
| | | | | 709/204 |
| 2011/0292884 | A1* | 12/2011 | Li | H04W 48/18 |
| | | | | 370/329 |
| 2012/0157121 | A1* | 6/2012 | Li | G01S 5/02 |
| | | | | 455/456.2 |
| 2013/0016629 | A1* | 1/2013 | Mallik | H04W 8/005 |
| | | | | 370/255 |
| 2016/0330625 | A1* | 11/2016 | Totzke | G06F 1/1632 |

OTHER PUBLICATIONS

Kryczka et al.," Measuring the Bittorrent Ecosystem: Techniques, Tips, and Tricks", IEEE Communications Magazine, vol. 49, No. 9, Sep. 1, 2011, pp. 144-152.

Wang, Zijian, "Peer-to-Peer multimedia streaming monitoring system Master Thesis", Eindhoven, Retrieved from URL:http://alexandria.tue.nl/extra1/afstversljwsk-i/Wang 2014.pdf Aug. 1, 2014, 61 pages.

Canadian Office Action received for Patent Application Serial No. 2,980,953 dated Jul. 27, 2018, 4 pages.

International Preliminary Report on Patentability received for International Patent Application No. PCT/EP2015/056886 dated Oct. 12, 2017, 9 pages.

* cited by examiner

Monitor network traffic between a first peer and the P2P network so as to identify a first subset of peers in the P2P network — S501

Prevent the first peer from communicating with at least one peer in the first subset of peers — S502

500

MONITORING A PEER-TO-PEER NETWORK

FIELD OF THE INVENTION

The present invention relates to monitoring a peer-to-peer network. In particular, the present invention relates to methods, apparatus, computer programs and computer-readable media for monitoring a peer-to-peer network.

BACKGROUND OF THE INVENTION

There exist a broad range of systems for distribution of content (audio, video, and data) over the internet. These systems can be subdivided in centralised Content Delivery Network (CDN) and in distributed peer-to-peer (P2P) networks. CDNs are popular as service providers have more control over the Quality of Service. P2P content streaming infrastructures are gaining popularity due to their cost-effectiveness and scalability. The content distributed in P2P networks can be pre-recorded or live TV, for example.

For many content distribution networks it is commercially desirable to perform audience measurement. This is easily implemented for centralised CDNs. However, such audience monitoring (measuring the popularity of content in a network) is desirable for P2P networks as well.

The present invention seeks to provide a P2P network monitoring method which provides various advantages over those of the prior art.

SUMMARY OF THE INVENTION

According to a first aspect of the present invention, there is provided a method of monitoring a peer-to-peer network. The method comprises: (i) monitoring network traffic between a first peer and the peer-to-peer network so as to identify a first subset of peers in the peer-to-peer network; and (ii) preventing the first peer from communicating with at least one peer in the first subset of peers to thereby cause the first peer to communicate with at least one further peer in the peer-to-peer network so as to enable identification of the at least one further peer.

In some embodiments, said monitoring comprises monitoring one or more communication parameters associated with the network traffic, the one or more communication parameters being selected from the group consisting of: IP addresses; port numbers, communication protocols, data rate, and latency. Additionally/alternatively, said monitoring comprises monitoring content associated with the network traffic.

Advantageously, said preventing comprises configuring a firewall associated with the first peer to block communications between the first peer and the at least one peer.

Optionally, the method further comprises configuring the first peer to access particular content via the peer-to-peer network.

Optionally, said preventing comprises randomly selecting the at least one peer from the subset of peers.

Advantageously, the method further comprises monitoring network traffic between a second peer and the peer-to-peer network so as to identify a second subset of peers in the peer-to-peer network. More advantageously, said preventing comprises selecting a duplicate peer as said at least one peer, the duplicate peer being a peer which forms part of both the first and second subsets of peers. Still more advantageously, the method further comprises retaining said duplicate peer in the second subset of peers. In some embodiments, the method further comprises preventing the second peer from communicating with at least one peer in the second subset of peers to thereby cause the second peer to communicate with at least one additional peer in the peer-to-peer network so as to enable identification of the at least one additional peer.

According to a second aspect of the present invention, there is provided a computer program which, when executed by one or more processors, causes the one or more processors to carry out the method of the first aspect.

According to a third aspect of the present invention, there is provided a computer-readable medium storing the computer program of the second aspect.

According to a fourth aspect of the present invention, there is provided a peer-to-peer network monitor for monitoring a peer-to-peer network, wherein the monitor is operable to monitor network traffic between a first peer and the peer-to-peer network so as to identify a subset of peers in the peer-to-peer network in communication with the first peer, and wherein the monitor is operable to prevent the first peer from communicating with at least one peer in the subset of peers to thereby cause the first peer to communicate with at least one further peer in the peer-to-peer network so as to enable the monitor to identify the at least one further peer.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
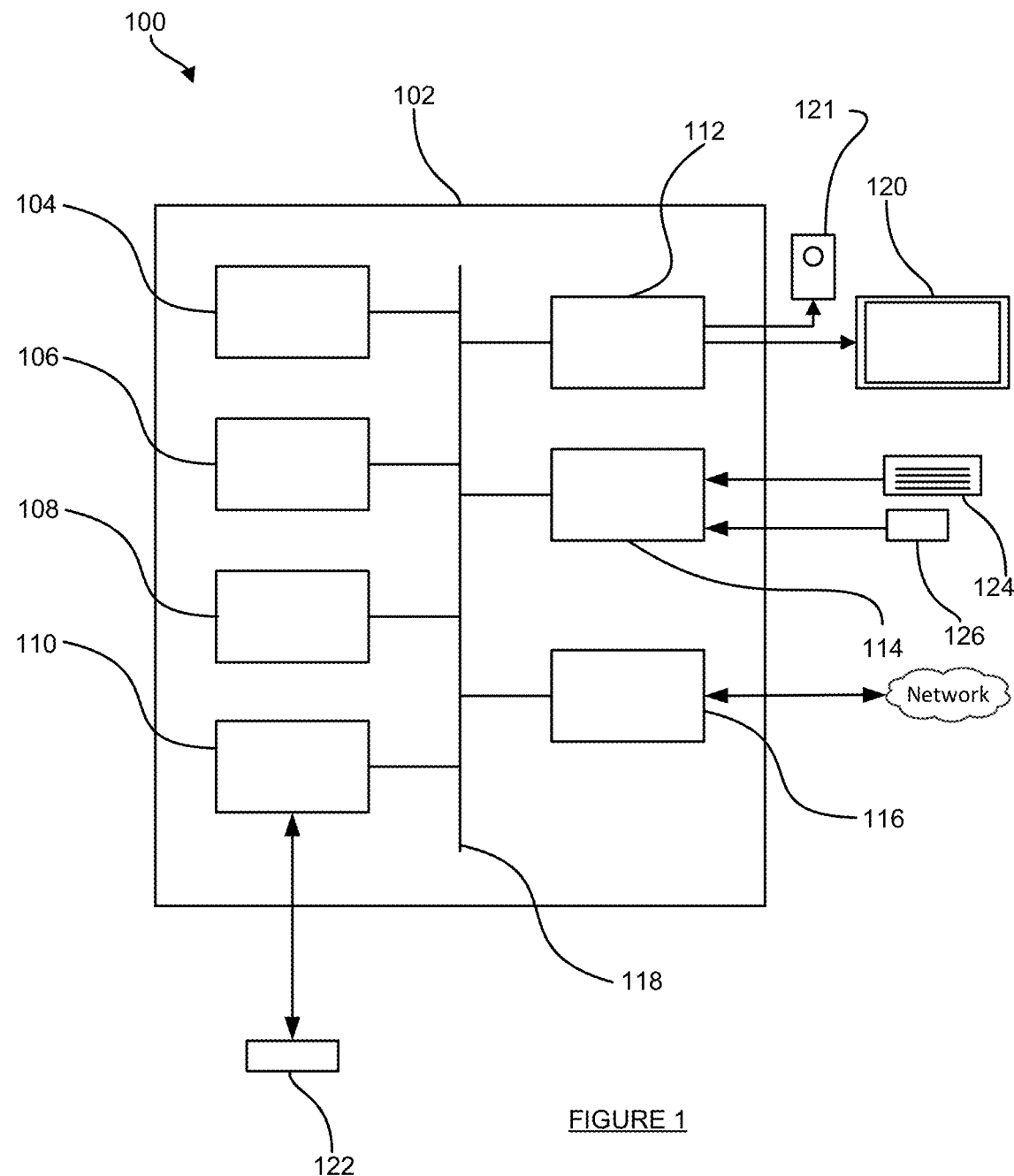
FIG. 1 schematically illustrates an example of a computer system 100 which may be used in embodiments of the present invention.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

2—Peer-to-Peer Networks

Figure 2:
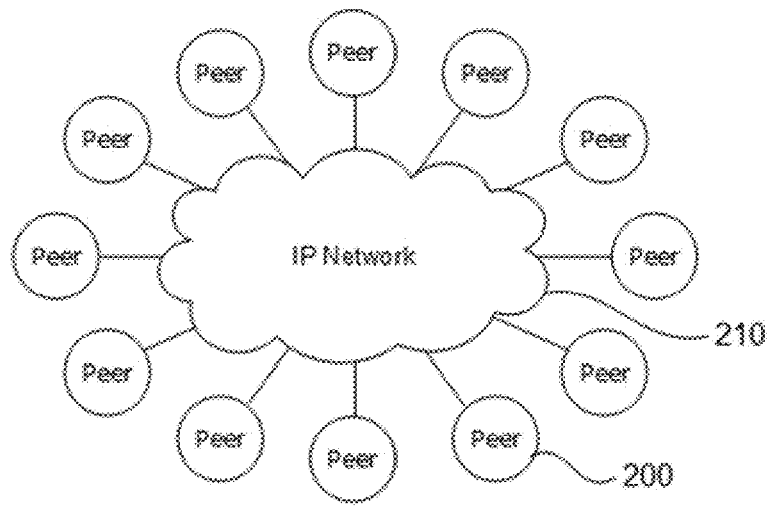
FIG. 2 schematically illustrates a P2P network which may be monitored in embodiments of the present invention.

A peer-to-peer (P2P) network consists of a collection of "peers" that have the ability to exchange content. The P2P network usually forms a virtual overlay network on top of an existing network infrastructure such as TCP/IP as illustrated schematically in FIG. 2 where a plurality of peers 200 are connected over a P2P network 210.

A peer 200 in a P2P network 210 may be implemented as a P2P software application on a computer such as a PC, laptop, tablet and the like (e.g. computer 102). A peer 200 may alternatively be implemented in the firmware of specific purpose devices such as a Set Top Box (STB), a digital TV receiver, or a home entertainment player.

Each peer 200 is operable to discover other peers 200 in the P2P network 210, to discover the content shared by those peers 200, and to exchange selected content with one or more peers 200 in the network 210. The peer discovery and content discovery steps continue even when the peer 200 is exchanging content with other peers 200. This background process enables the P2P network 210 to handle peers 200 entering and leaving due to various unavailability reasons (e.g. a peer's P2P software application may no longer be active, a peer's network connection may be unavailable, or a peer's computer may no longer be active).

After performing peer discovery and content discovery steps, a peer 200 can start exchanging content. The peer 200 does this by requesting the selected content from the list of peers 200 that was established during the content discovery process.

Figure 3:
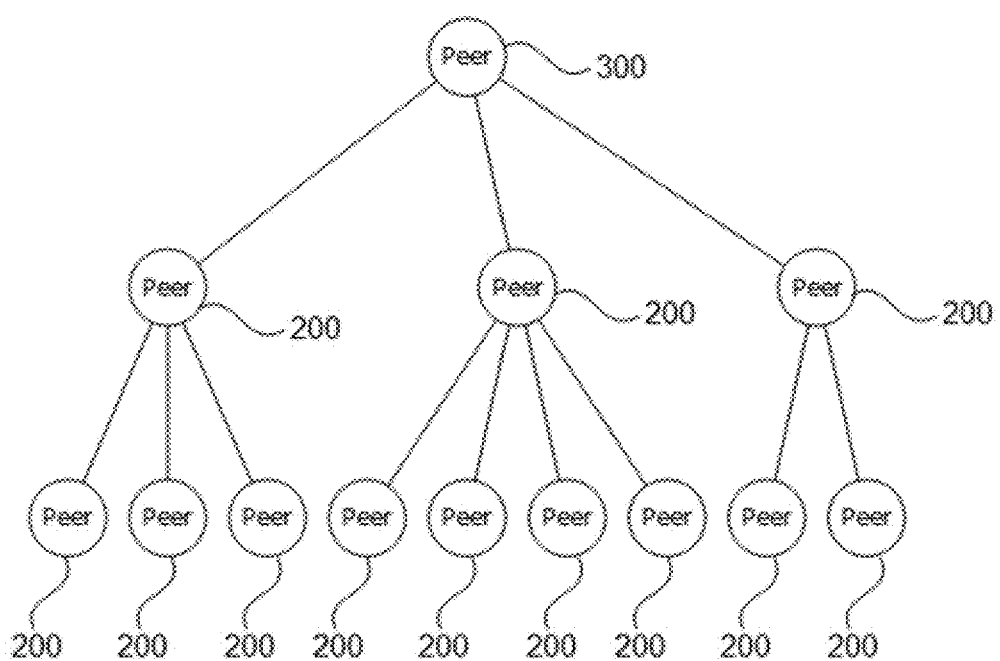
FIG. 3 schematically illustrates content delivery via a seed peer in a P2P network.

As the peer 200 receives content, it will also make the content available to other peers 200 in the network 210. A seed peer is a peer that starts publishing some content. When other peers 200 in the network 210 obtain that content, they can forward it to other peers 200 in the network. This is schematically illustrated in FIG. 3 which shows a seed peer 300 and an exemplary distribution of content to other peers 200 in the network 210.

This manner of distributing content in a P2P network 210 shares the bandwidth for uploading the content over many peers 200. This property makes a P2P network 210 suitable for video content distribution for both pre-recorded and "live" video content. In the content discovery process, a peer 200 obtains the details of a subset of peers 200 that can provide access to the content. This subset of peers 200 is sometimes referred to as a peer overlay. The entire set of peers 200 that have access to a particular piece of content is called a swarm. There are some differences between the content discovery and content exchange processes for pre-recorded and live content, but these details are not relevant for the technology described in this document.

3—Monitoring Peer-to-Peer Networks

Figures 4, 5:
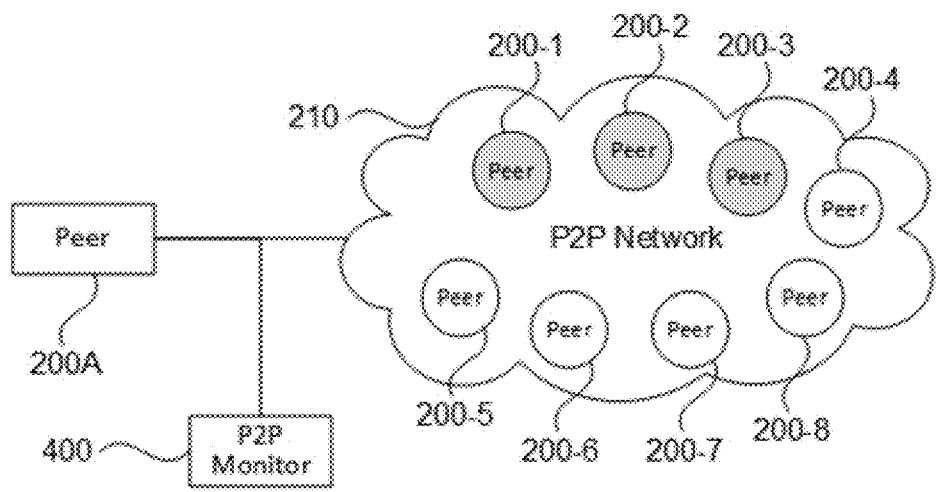
FIG. 4 schematically illustrates a passive monitor for monitoring a P2P network in accordance with embodiments of the invention.
FIG. 5 schematically illustrates a method of monitoring a P2P network according to an embodiment of the invention.

Passive monitoring refers to a process of measuring properties in a communication network without creating or modifying any traffic on the network. FIG. 4 illustrates passive monitoring of a peer-to-peer (P2P) network 210 using a monitor 400 which monitors network traffic between a first peer 200A and the P2P network 210 so as to identify a first subset of peers 200 in the P2P network 210. In FIG.

4, the P2P network 210 contains 8 peers 200-1 to 200-8. Peers 200-1 to 200-3 have been highlighted to indicate that these peers form the subset of peers with which the first peer 200A is found to be communicating. In particular, the monitor 400 observes packets travelling through a link between the first peer 200A and peers 200-1 to 200-3 in the P2P network 210. This approach can provide detailed information about the monitored first peer 200A without requiring any specific knowledge of the implementation of the P2P software application or the P2P firmware. Given knowledge of the P2P network communication protocol, the monitor 400 is operable to record contact information for the subset of peers 200-1 to 200-3 that provide access to a specific piece of content.

Due to the wide range of P2P network types (protocols), existing passive monitoring techniques only produce a relatively small subset of the number of peers 200 that have access to a particular piece of content. This makes it difficult to obtain accurate audience measurements for P2P network infrastructures. Therefore, the present invention provides an enhanced passive monitoring technique, as described below.

As illustrated schematically in FIG. 5, in accordance with embodiments of the present invention, there is provided a computer-implemented method 500 of monitoring a P2P network 210 using a passive monitor such as the monitor 400 shown in FIG. 4. The method comprises a first step S501 of monitoring network traffic between a first peer 200A and the P2P network so as to identify a first subset of peers 200 in the P2P network 210. The method further comprises a second step S502 of preventing the first peer 200A from communicating with at least one peer 200 in the first subset of peers 200 to thereby cause the first peer 200A to communicate with at least one further peer 200 in the P2P network 210 so as to enable identification of the at least one further peer 200.

In accordance with the present invention, the monitor 400 monitors network traffic between a first peer 200A and the P2P network 210 so as to identify a first subset of peers 200 in the P2P network 210. The monitor 400 does this by measuring properties of communications (packets) between the first peer 200A and other peers 200 in the P2P network 210 without creating or modifying any traffic on the network. Thus, the monitor 400 is able to detect a subset of peers 200 participating in exchange of data with the first peer 200A via an arbitrary P2P system such as the P2P network 210. In this way, the size of the peer overlay for the first peer 200A may be determined. Clearly, if the first peer 200A is not communicating with a particular peer 200 in the P2P network, then that particular peer will not be detected by the monitor 400 (and will not form part of the detected subset of peers 200) since there will be no packets travelling between the first peer 200A and that particular peer 200.

The monitor 400 may be implemented as hardware, firmware of software. If the monitor 400 is implemented as software, then the monitor software may be running on the same computing device as the P2P software application, i.e. the monitor software may be running on the hardware of the first peer 200A. Alternatively, the monitor software could be running on a separate device that has access to the communication link between the first peer 200A and the P2P network 210. This latter approach is useful for a first peer 200A that has been implemented as embedded software.

The functioning of the monitor 400 does not depend on any specific knowledge of the P2P protocol used by the P2P network 210 being monitored, but instead observes network traffic to and from the first peer 200A and records some basic communication parameters from this traffic. Examples of basic communication parameters are IP addresses of the detected subset of peers 200, port numbers of the detected subset of peers 200, communication protocols used, and general traffic statistics (data rate, latency). In other words, the monitoring step S501 may comprise monitoring one or more communication parameters associated with the network traffic, the one or more communication parameters being selected from the group consisting of: IP addresses; port numbers, communication protocols, data rate, and latency. The monitoring step S501 may also comprise monitoring content associated with the network traffic. The monitor 400 may then combine information on the observed communication parameters with information on the content associated with the network traffic (e.g. content selected by the first peer 200A).

The monitored network traffic in step S501 depends on the behaviour of the first peer 200A. As is standard in a P2P network, the first peer 200A discovers other peers 200 in the P2P network 210 and establishes communication with them. This establishes a communication overlay, i.e. a neighbour relationship with a subset of peers 200 in the P2P network 210. The efficiency of a P2P streaming network relies on its overlay structure. In a P2P streaming architecture, an overlay is formed by peers 200 viewing the same content. It is established by performing peer discovery and peer selection. The purpose of peer discovery is to find information about other peers 200 in the P2P network 210. Peer selection deals with how the first peer 200A constructs its neighbour relationship (i.e. peer overlay). A good peer selection process achieves the goals of minimizing packet delay, minimizing the total streaming rate at a peer, and optimizing resilience to P2P network dynamics.

A key factor for the peer selection process is the network connectivity of the peer 200. The first peer 200A can quantify the peer connectivity to another peer 200 using traffic statistical information such as packet delay and data rate. After constructing the communication overlay (i.e. peer overlay), the first peer 200A can start data exchange to obtain the desired content. Due to the dynamic nature of P2P networks, the overlay construction is a continuous process performed by each peer 200. In a typical P2P network 210, the number of peers 200 contacted by a single peer (a P2P client) is limited, mostly because there is no need for a single peer (e.g. the first peer 200A) to contact all peers 200 in a swarm (i.e. the entire subset of peers 200 having access to the same content). Due to the peer overlay optimization process, content data is exchanged mostly among neighbours. This means that the monitor 400 observes only a relatively small part of the swarm at any given time.

As mentioned above, step S502 of the method 500 involves preventing the first peer 200A from communicating with at least one peer in the first subset of peers 200. Referring to FIG. 4, recall that the first peer 200A is found to be communicating with three peers 200-1 to 200-3 in the P2P network 210 in this example. Thus, the first subset of peers 200 is initially made up of peers 200-1 to 200-3. Then consider an example where, in step S502, the monitor 400 prevents the first peer 200A from communicating with peer 200-1 in the first subset of peers 200. As per standard practice, the first peer 200A will continue with its usual peer discovery and peer selection procedures. This means that the background execution of the peer overlay optimization process will remove the blocked peer 200-1 from the first subset of peers which form the peer overlay. In turn, the first peer 200A will contact one or more further peers in the P2P network 210 for continued access to the content. Thus, for example, the new first subset of peers 200 following step S502 might be peers 200-2 to 200-4 (i.e. the blocked peer 200-1 has been removed from the subset, and a further peer 200-4 has been added). This approach works for any P2P system, as the mechanism relies on the essential collaboration and resilience features supported in any P2P network 210. The collaboration aspect requires peers 200 in a P2P network 210 to share content with any other peer that requests it. The resilience aspect requires the P2P network 210 to provide new points of contact for accessing content in order to survive network disturbances. Thus, preventing the first peer 200A from communicating with at least one peer (e.g. peer 200-1) in the first subset of peers 200 causes the first peer 200A to communicate with at least one further peer (e.g. peer 200-4) in the P2P network 210 so as to enable identification of that at least one further peer (peer 200-4).

Figure 6A:
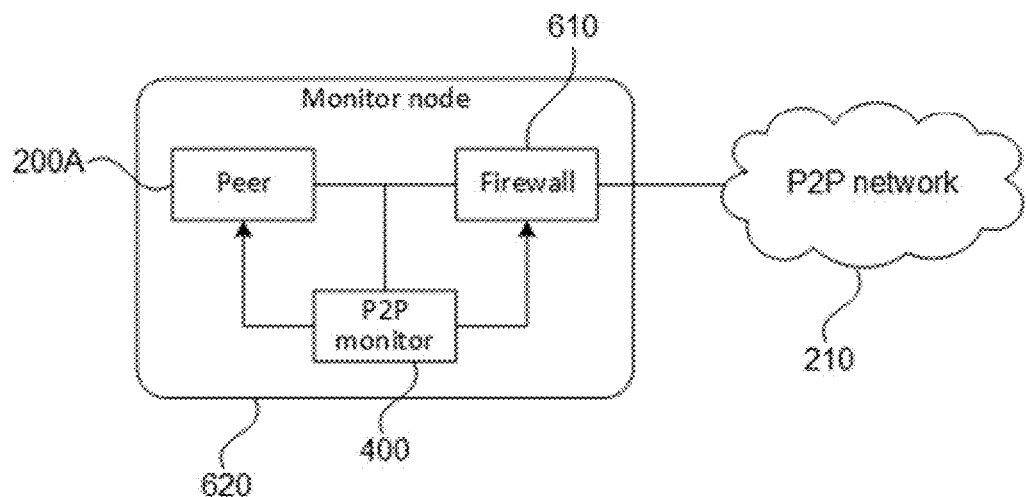
FIGS. 6A and 6B schematically illustrate monitor node arrangements for monitoring a P2P network in accordance with embodiments of the invention.
Figure 6B:
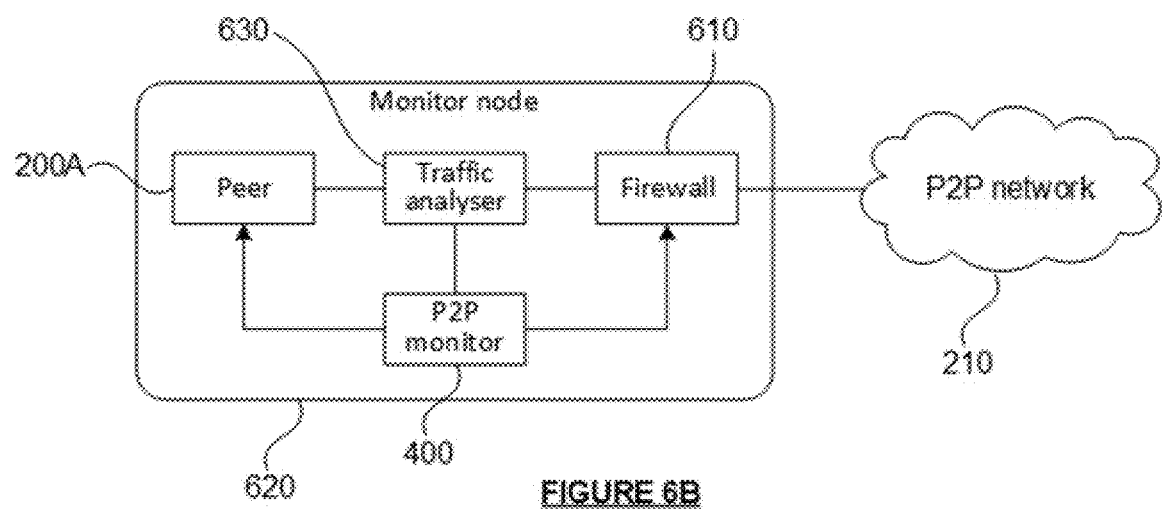

The monitor 400 therefore has the ability to break or block connections between the first peer 200A (i.e. the P2P client being monitored) and the P2P network 210. Exemplary arrangements for the monitor to block connections are schematically illustrated in FIGS. 6A and 6B. In these embodiments, the step S502 of the method 500 comprises configuring a firewall 610 associated with the first peer 200A to block communications between the first peer 200A and the at least one peer (i.e. the peer to be blocked). As is standard, the firewall 620 associated with the first peer 200A is disposed between the first peer 200A and the remainder of the P2P network 210.

FIG. 6A shows an arrangement that is similar to the arrangement of FIG. 4 in that the monitor 400 is operable to monitor network traffic between the first peer 200A and the P2P network 210 so as to identify a first subset of peers 200 in the P2P network 210. However, there are two (independent) differences between the embodiments of FIGS. 4 and 6A. Firstly, the monitor 400 of FIG. 6A is operably coupled to the first peer 200A so as to configure the first peer 200A to access certain content. This is illustrated by the arrow going from the monitor 400 to the first peer 200A in FIG. 6A. This can be done manually or by the monitor 400 replacing user inputs to the first peer 200A. In this embodiment, the method 500 further comprises configuring the first peer to access particular content via the P2P network. The purpose of this first difference is to configure the first peer 200A to access the appropriate content. This is particularly useful in remote operations where the operator of the monitor 400 and associated monitoring network has no direct access to any of the monitored peers (e.g. the first peer 200A). Automating the user controls for the P2P application of the first peer 200A simplifies the operation of the monitoring scheme. Secondly, the monitor 400 of FIG. 6A is operably coupled to the firewall 610 so as to configure the firewall 610 to block any communication to/from one or more peers 200 that the monitor 400 has observed as being in the peer overlay of the first peer 200A. In other words, the monitor 400 is operable to prevent the first peer 200A from communicating with at least one peer in the first subset of peers 200. This is illustrated by the arrow going from the monitor 400 to the firewall 610 in FIG. 6A. Together, the first peer 200A, the monitor 400 and the firewall 610 may be considered as a monitor node 620, i.e. a node of a P2P network monitoring system.

The monitor 400 may be operable to measure network traffic associated with a particular P2P protocol of the P2P network 210. For example, the monitor 400 may use a transport layer protocol such as TCP or UDP. In this case, the monitor 400 is operable to monitor port numbers associated with the network traffic so as to identify the subset of peers 200. Furthermore, the monitor 400 is operable to configure the firewall 610 to block communications between the first peer 200A and the port number associated with the at least one peer that is to be removed from the peer overlay of the first peer 200A. Alternatively, the monitor 400 may operate at a lower level in the communication stack (e.g. at the internet level, IP). In this case, the monitor 400 uses the peer addresses contained in that lower layer to configure the firewall 610. For example, the monitor 400 may monitor IP addresses associated with the network traffic, and then use the monitored IP addresses to configure the firewall 610 to block access to some or all of these IP addresses. Instead of blocking all network traffic to a given IP address or port number, the monitor 400 can also block network traffic based on other monitored communication parameters.

Of course, a monitor 400 that is only operable to measure network traffic associated with a particular P2P protocol of the P2P network 210 will not be able to function properly if the P2P network communication adopts a tunneling protocol. A tunneling protocol allows a foreign protocol to run over a network that does not support that particular protocol (e.g. running IPv6 over IPv4). In such a case, the P2P dataflow is encapsulated in a foreign protocol. In such cases, the embodiment of FIG. 6B becomes desirable.

FIG. 6B shows an arrangement that is similar to the arrangement of FIG. 6A in that the monitor 400 is operable to configure the first peer 200A to access certain content, and is further operable to configure the firewall 610 to block any communication to/from one or more peers 200 that the monitor 400 has observed as being in the peer overlay of the first peer 200A. The key difference between FIGS. 6A and 6b is the provision of a traffic analyser module 630 as part of the monitor node 620 in FIG. 6B. The traffic analyser 630 is disposed between the first peer 200A and the firewall 610. The traffic analyser 630 is operable to monitor the network traffic so as to extract basic communication parameters (such as peer IP addresses, etc. as mentioned above) from the network traffic regardless of the communication protocol being used. The traffic analyser 630 accomplishes this by stripping away additional protocol layers that hide the basic communication parameters from the standard communication analysis function in the monitor 400. This enables the monitor 400 to support a broad range of P2P protocols in a modular way. In addition, the traffic analyser 630 may be used by the monitor 400 in order to assist in blocking network communications to particular peers in the P2P network 210. In particular, the traffic analyser 630 is operable to identify which communications are addressed to the peer to be blocked.

FIGS. 6A and 6B schematically illustrate a monitor node 620 comprising a peer 200A, a monitor 400, a firewall 610, and an optional traffic analyser 630. It is possible to deploy multiple monitor nodes 620 so as to further increase the number of observed peers 200 in the P2P network 210. An exemplary arrangement is shown in FIG. 7.

Figure 7:
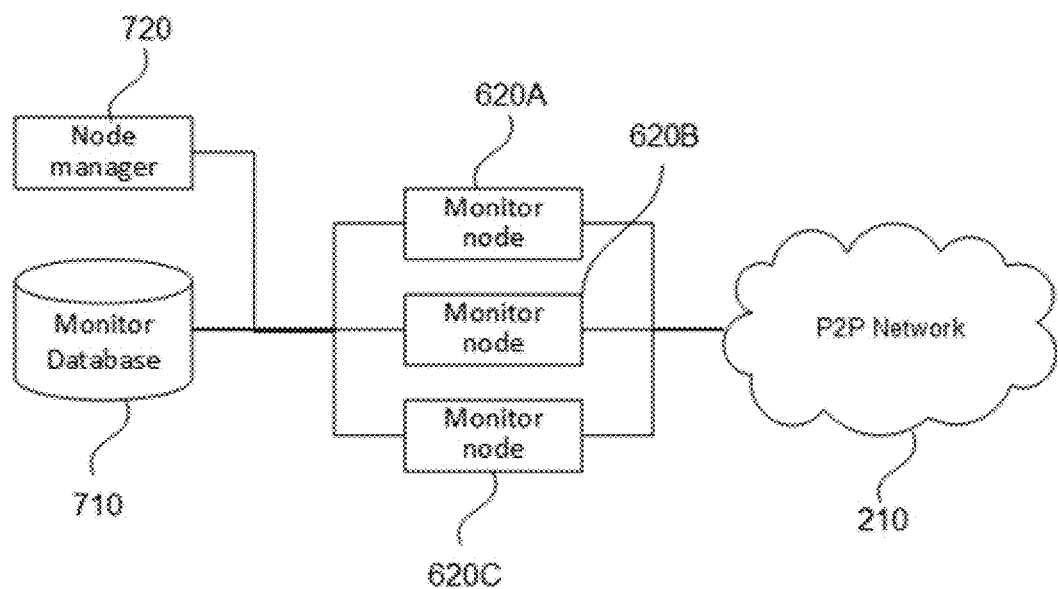
FIG. 7 schematically illustrates a monitor system comprising multiple P2P network monitor nodes as shown in FIGS. 6A and/or 6B.

FIG. 7 shows three monitor nodes 620A, 620B, 620C in communication with the P2P network 210. The first monitor node 620A includes a first peer 200A, a first monitor 400A, a first firewall 610A, and an optional first traffic analyser 630A (not shown). The second monitor node 620B includes a second peer 200B, a second monitor 400A, a second firewall 610A, and an optional second traffic analyser 630A (not shown). The third monitor node 620C includes a third peer 200C, a third monitor 400A, a third firewall 610A, and an optional third traffic analyser 630A (not shown). Each monitor 400A, 400B, 400C is operable to monitor network traffic between its respective peer 200A, 200B, 200C and the P2P network 210 so as to identify respective first, second and third subsets of peers in the P2P network 210. Each monitor 400A, 400B, 400C is further operable to prevent its respective peer 200A, 200B, 200C from communicating with at least one respective peer in the first, second and third subsets of peers. This causes each of the peers 200A, 200B, 200C to communicate with at least one further respective peer in the P2P network 210 so as to enable identification of the further peers.

The three monitor nodes 620A, 620B, 620C are communicably coupled to a monitor database 710 and a node manager 720 via a separate communication network, such as a private communication network. The monitor database 710 is operable to store peer data collected by the three monitor nodes 620A, 620B, 620C. The peer data relates to the first, second and third subsets of peers, for example. The node manager 720 can be implemented in a centralized or de-centralized fashion. The node manager 720 is operable to use the peer data from the monitor database 710 to configure the monitor nodes 620A, 620B, 620C. For example, the node manager 720 may be responsible for selecting which peers in the first, second and third subsets of peers are to be blocked from communicating with the respective first, second and third peers 200A, 200B, 200C. The selection process for blocking peer connections can be random. In this case, the step S502 of the method 500 comprises randomly selecting the peer(s) to be blocked from the subsets of peers. Alternatively, the selection process for blocking peer connections can be based on an adaptive process that serves to increase the number of further peers being detected in a renewed peer overlay, as described below.

For any P2P network, there is the possibility that the monitored peers 200A, 200B, 200C may be communicating with one or more of the same other peers 200. In other words, there is the possibility of overlap between the first, second and third subsets of peers, which results in redundant observation of peers. This is particularly likely when the monitor nodes 620A, 620B, 620C are placed in the same segment of the P2P network, or in the same geographical region, or when the swarm is just very small. The system shown in FIG. 7 may reduce the redundant observation of peers by using the node manager 720 to coordinate the blocking of peers. In particular, the node manager 720 may be operable to search the monitor database 710 to identify redundantly observed peers. For each redundantly observed peer, the node manager 720 may instruct a subset of the monitor nodes 620A, 620B, 620C to maintain their P2P connection to the redundant node. The node manager 720 may further be operable to instruct the remaining monitor nodes 620A, 620B, 620C to block their P2P connection to the redundant node. The selection of the subset of monitor nodes may vary for each redundantly observed peer. Because some monitor nodes 620A, 620B, 620C will break/block P2P connections for redundantly observed peers, their respective communication overlays will be reconstructed, thus allowing the set of monitor nodes 620A, 620B, 620C to observe more peers in the swarm.

Thus, in this embodiment, the method 500 further comprises monitoring network traffic between the second peer 200B and the P2P network 210 so as to identify a second subset of peers in the P2P network 210. Furthermore, the step S502 of the method 500 comprises selecting a duplicate peer as the peer to be blocked from communicating with the first peer 200A, where the duplicate peer is a peer which forms part of both the first and second subsets of peers. In other words, the duplicate peer is selected as a peer to be removed from the first subset of peers. The method 500 may comprise retaining the duplicate peer in the second subset of peers. Alternatively, the method 500 may comprise removing the duplicate peer from the second subset of peers by preventing the associated communications. The method 500 may further comprise preventing the second peer 200B from communicating with at least one peer in the second subset of peers to thereby cause the second peer 200B to communicate with at least one additional peer in the P2P network so as to enable identification of the at least one additional peer.

The method 500 may further comprise monitoring network traffic between the third peer 200B and the P2P network 210 so as to identify a third subset of peers in the P2P network 210. Furthermore, the step S502 of the method 500 may comprise selecting a duplicate peer as the peer to be blocked from communicating with the first peer 200A, where the duplicate peer is a peer which forms part of both the first and third subsets of peers. In other words, the duplicate peer is selected as a peer to be removed from the first subset of peers. The method 500 may comprise retaining the duplicate peer in the third subset of peers. Alternatively, the method 500 may comprise removing the duplicate peer from the third subset of peers by preventing the associated communications. The method 500 may further comprise preventing the third peer 200B from communicating with at least one peer in the third subset of peers to thereby cause the second peer 200B to communicate with at least one additional peer in the P2P network so as to enable identification of the at least one additional peer.

It will be appreciated that the above description of two or three monitoring nodes 620 is exemplary, and further monitor nodes 620 may be added to the monitoring system of FIG. 7 in a similar manner as desired.

Thus, we have described a separate P2P network monitor 400 (e.g. a monitoring software application) that passively monitors a first peer 200A in a P2P network 210 to determine which content is available on the P2P network and to increase visibility of the number of peers 200 by recording connection requests and by blocking selected connection requests. Since the blocking reduces the number of peers in the swarm, the first peer (e.g. a P2P software application) will need to re-calculate (or re-establish) its P2P network overlay (swarm), which will increase the number of peers 200 observable to the monitor. In a variant, the monitor 400 may exchange data concerning its observed peers (e.g. address information) to other monitors so as to decrease redundant observations of peers. The described methods and systems provide a passive monitoring technology for a P2P network for obtaining audience measurements that enables the observation of a (substantially) larger subset of peers.

As well as the method 500, the present invention provides a P2P network monitor 400 for monitoring a P2P network 210. The monitor 400 is operable to monitor network traffic between a first peer 200A and the P2P network 210 so as to identify a subset of peers 200 in the P2P network 210 in communication with the first peer 200A. The monitor is operable to prevent the first peer 200A from communicating with at least one peer in the subset of peers 200 to thereby cause the first peer 200A to communicate with at least one further peer in the P2P network 210 so as to enable the monitor 400 to identify the at least one further peer. In one embodiment, the monitor 400 may be implemented integrally with the first peer 200A. For example, the first peer 200A may be a computing device operable to run a P2P software application for discovering other peers 200 in the P2P network 210 and for selecting the subset of peers 200 to communicate with, and the monitor 400 may also be implemented on that computing device (e.g. the monitor 400 is/comprises a software application operable to run on the computing device). Alternatively, the monitor 400 may be implemented separately from the first peer 200A (i.e. the monitor 400 is distinct from the first peer 200A). For example, the first peer 200A may be a computing device operable to run a P2P software application for discovering other peers 200 in the P2P network 210 and for selecting the subset of peers 200 for the first peer 200A to communicate with, and the monitor 400 may be a separate computing device having access to the network traffic between the first peer 200A and the P2P network 210 (e.g. the monitor 400 is/comprises a software application operable to run on a separate computing device having access to the network traffic between the first peer 200A and the P2P network 210).

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by one or more processors, of monitoring a peer-to-peer network, the method comprising:
    monitoring network traffic between a first peer and the peer-to-peer network so as to identify a first subset of peers in the peer-to-peer network, the first peer being in communication with other peers in the first subset of peers; and
    preventing the first peer from communicating with at least one peer in the first subset of peers to thereby cause the first peer to conduct a peer discovery process and select at least one further peer in the peer-to-peer network so as to enable identification of the at least one further peer, wherein the at least one further peer is not in the first subset of peers.

2. The method of claim 1 wherein said monitoring comprises monitoring one or more communication parameters associated with the network traffic, the one or more communication parameters being selected from the group consisting of: IP addresses;
    port numbers, communication protocols, data rate, and latency.

3. The method of claim 1 wherein said monitoring comprises monitoring content associated with the network traffic.

4. The method of claim 1 wherein said preventing comprises configuring a firewall associated with the first peer to block communications between the first peer and the at least one peer.

5. The method of claim 1 further comprising configuring the first peer to access particular content via the peer-to-peer network.

6. The method of claim 1 further comprising monitoring network traffic between a second peer and the peer-to-peer network so as to identify a second subset of peers in the peer-to-peer network.

7. The method of claim 6 wherein said preventing comprises selecting a duplicate peer as said at least one peer, the duplicate peer being a peer which forms part of both the first and second subsets of peers.

8. The method of claim 7 further comprising retaining said duplicate peer in the second subset of peers.

9. The method of claim 6 further comprising preventing the second peer from communicating with at least one peer in the second subset of peers to thereby cause the second peer to conduct a peer discovery process and select at least one additional peer in the peer-to-peer network so as to enable identification of the at least one additional peer, wherein the at least one additional peer is not in the second subset of peers.

10. The method of claim 1 wherein said preventing comprises randomly selecting the at least one peer from the first subset of peers.

11. One or more tangible non-transitory computer readable media comprising computer program code which, when executed by one or more processors, causes the one or more processors to carry out a method of monitoring a peer-to-peer network by:

monitoring network traffic between a first peer and the peer-to-peer network so as to identify a first subset of peers in the peer-to-peer network; and preventing the first peer from communicating with at least one peer in the first subset of peers to thereby cause the first peer to conduct a peer discovery process and select at least one further peer in the peer-to-peer network so as to enable identification of the at least one further peer, wherein the at least one further peer is not in the first subset of peers.

12. A peer-to-peer network monitor for monitoring a peer-to-peer network, the peer-to-peer network monitor comprising:

at least one processor in communication with the peer-to-peer network, wherein the monitor is operable to monitor network traffic between a first peer and the peer-to-peer network so as to identify a subset of peers in the peer-to-peer network in communication with the first peer, and wherein the monitor is operable to prevent the first peer from communicating with at least one peer in the subset of peers to thereby cause the first peer to conduct a peer discovery process and select at least one further peer in the peer-to-peer network so as to enable the monitor to identify the at least one further peer, wherein the at least one further peer is not in the first subset of peers.

* * * * *